United States Patent [19]

Kimmel

[11] 4,432,480

[45] Feb. 21, 1984

[54] ROOF ATTACHED ARTICLE CARRIER FOR VEHICLES

[76] Inventor: Walter Kimmel, Am Schlossfeld 30, 8950 Kaufbeuren, Fed. Rep. of Germany

[21] Appl. No.: 299,947

[22] Filed: Sep. 8, 1981

[30] Foreign Application Priority Data

Sep. 9, 1980 [DE] Fed. Rep. of Germany ....... 3033903

[51] Int. Cl.³ .............................................. B60R 9/00
[52] U.S. Cl. .................................... 224/329; 224/917; 211/605 K
[58] Field of Search ............... 224/315, 329, 330, 331, 224/917; 414/462; 211/605 K

[56] References Cited

U.S. PATENT DOCUMENTS 3,710,998  1/1973  Marker .......................... 224/42.1 F
4,081,095  3/1978  Wilburn et al. ..................... 414/462

Primary Examiner—Steven M. Pollard
Assistant Examiner—David Voorhees
Attorney, Agent, or Firm—Holman & Stern

[57] ABSTRACT

A roof top carrier for a car of the type wherein the ends thereof are attached to the roof structure to be supported thereon. A transverse member is horizontally supported at its ends from the roof structure and has removably attachable thereto an inverted U-shaped retainer carrier and a pivotable locking lever at the ends of the transverse member which has a locking ridge thereon engageable with the end of the retainer carrier when in the locked position to prevent displacement and removal thereof.

9 Claims, 2 Drawing Figures

U.S. Patent  Feb. 21, 1984  4,432,480
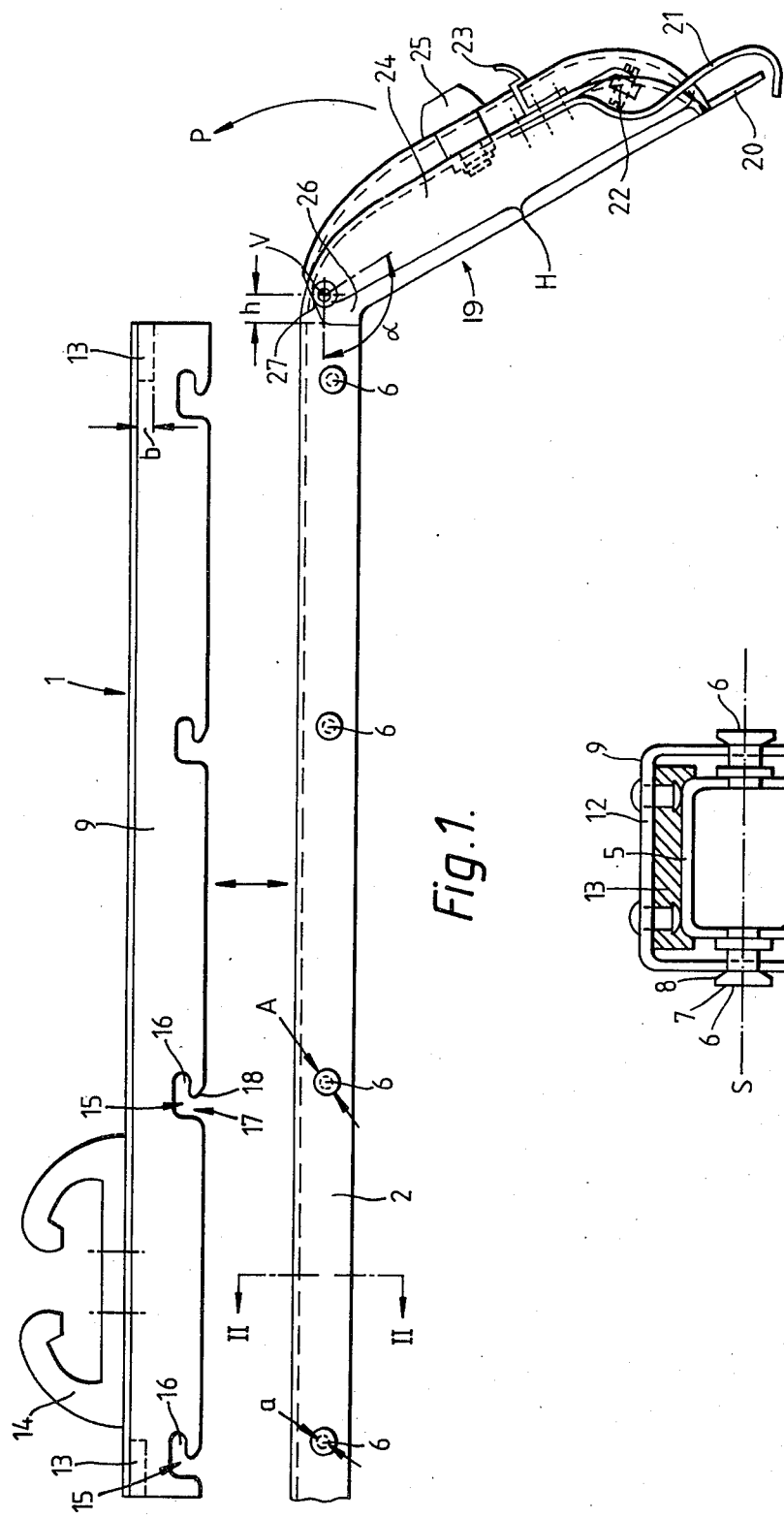

ROOF ATTACHED ARTICLE CARRIER FOR VEHICLES

BACKGROUND OF THE INVENTION

1. Field of the Invention

The invention relates to a vehicle-roof load carrier comprising at least one transverse member, which at both ends rests on the vehicle and is provided with replacable retainers for the load, which retainers are lockable in relation to the transverse member.

2. Description of the Prior Art

From German patent 25 48 675 there is previously known a vehicle-roof load carrier in which the retainers are designed as load supports. These are introduceable into apertures in the transverse member and are lockable by means of a rod which is insertable through openings in the load supports. The rod is inserted from the lateral ends of the transverse member and is provided with a cover at its free end by means of which a locking lever for anchoring the carrier to the rain gutter of the vehicle is covered.

In order to replace the load supports the rod is removed whereupon the load supports are removed upwards and are replaced by load supports for example designed in another way.

It is a drawback that for the insertion of the rod after a replacement of the load supports these have to be positioned very carefully in the transverse member, as it is otherwise not possible to insert the rod through the load supports for providing the locking thereof. It is not possible to observe from the outside if the load supports are correctly positioned, as the transverse member is designed as a square pipe which because of the closed section does not allow any observation. This is cumbersome especially when dirt has penetrated into the apertures for the load supports and the correct positioning of the load supports in relation to the locking rod is uncertain.

It is also a drawback that the rod has to be removed laterally in relation to the longitudinal axis of the ehicle in order to be released. Thereby the rod constitutes an obstacle when passing the vehicle.

The load supports are loose when not being attached to the transverse member, and such separate members can easily be mislaid or lost.

SUMMARY OF THE INVENTION

The object of the present invention is to provide a roof load carrier of the kind referred to above, in which the retainers in a rapid and simple way can be replaced by other retainers.

In accordance with the invention, this object is achieved by each transverse member comprising at least one retainer carrier which is connectable with the transverse member and carries the retainers. The transverse member constitutes the basic structure for the roof load carrier. Preferably the transverse member is adjustable with regard to its width in order to be adapted to all common types of vehicles. If the roof load carrier is intended for only one type of vehicle, the adjustment can be conducted only once. The retainer carrier is connectable with the transverse member in every adjustment position thereof. It offers the possibility of adaption to the intended purpose. Each retainer carrier includes retainers which are fixedly connected therewith, for example ski holders, surf-board holders, suitcase holders, bike holders and so on. Thus, if skis are to be transported instead of a surf-board it is sufficient to release the retainer carrier and replace the same by the other retainer carrier, which is provided with the desired retainers for the load to be transported. In principle, the retainers can be releasably connected with the retainer carriers so that each user can provide his own desired retainer carrier, for example one comprising a combination of retainers. Thereby, the retainers are in the normal case fixedly connected with the retainer carriers with no risk of getting lost. Also, the connection is very easy to provide, as it is sufficient to release the locking device, remove one retainer carrier and position another retainer carrier, whereupon the device is locked again.

An advantageous development of the invention is constituted by the fact that the transverse member and/or the retainer carrier comprises coupling elements for the mutual anchoring which are shaped so as to provide an engagement. In this way there is provided a mutual locking which is sufficient for the normal stressing of the roof load carrier.

Thereby, it is advantageous if the retainer carrier is shaped as a channel bar covering the transverse member. The channel bar can easily be positioned on the transverse member from above or from one of the sides thereof and can then be anchored. Because of its U-shaped section it constitutes a rigid unit and also increases the stability of the transverse member in the locked position. With regard to the types of retainers which the carriers support, the channel bar can be designed stronger or weaker.

A simple mutual anchoring between the transverse members and the retainer carriers is provided if the transverse member comprises pins projecting transversely of the longitudinal direction of the transverse member adapted to cooperate with coupling openings in the channel bar. It is sufficient to position the channel bar in such a way on the transverse member that the pins are introduced into the openings and then to lock the retainer carrier. The pins can be releasably or fixedly connected with the transverse member. It is also possible to let the pins project from one, two or more sides of the transverse member.

In order to displace the retainer carrier to its locking position each coupling opening is in an advantageous development of the invention shaped as a slot extending in the longitudinal direction of the channel member. Each slot can have an entrance opening for the introduction of the pin belonging to said slot. When the retainer carrier is positioned on the transverse member it should be observed that the entrance openings are positioned opposite to the pins whereupon the retainer carrier can be positioned on the transverse member. In order to provide the locking it is thereupon only necessary to displace the retainer carrier on the transverse member in the longitudinal direction of said members, whereby the above mentioned locking through shape engagement is obtained.

With regard to the manufacturing of the roof load carrier it is advantageous if the transverse member is shaped as a downwards open channel member. The open channel member has a rigid section.

An advantageous development of the invention is also constituted by each retainer carrier being connected with a locking lever which is pivotably journalled on the transverse member and in its open position allows the removal and replacement of the retainer carrier, while in its closed position locks the retainer carrier on the transverse member in a coupled position by means of a locking ridge. Preferably the locking lever is designed as a two-arm lever in which one lever constitutes the handle and the other lever constitutes the locking ridge. The two arms of the lever are positioned opposite to each other with regard to the pivot axis, but can also form an angle less than 180° in relation to each other. After a retainer carrier has been positioned on the transverse member the locking lever, when moved from its open position to its locked position, displaces the carrier so that the coupling members reach their shape engagement position. The locking lever can be provided with a lock by means of which it can be locked in its locking position.

BRIEF DESCRIPTION OF THE DRAWING

An embodiment of the invention will now be described in in detail with reference to the accompanying drawing wherein:

FIG. 1 is a side elevational view of a roof load carrier according to the invention including a transverse member and a retainer carrier, and FIG. 2 is a cross-section of the invention taken along line II—II of the device of FIG. 1, in which the retainer carrier is shown positioned on the transverse member.

DETAILED DESCRIPTION

In FIG. 1 there is shown a roof load carrier 1 for vehicles, preferably automotive vehicles. The drawing includes only the right half of the load carrier. The left half is a reversed or mirror image of the right half and has been omitted for clearness. The load carrier comprises a transverse member 2 which consists of a downwardly open channel-shaped bar. This means that the flanges 3 and 4 of the channel-shaped bar are vertically positioned while the web portion 5 is horizontally positioned. The transverse member is usually provided in a horizontal position on the roof of a vehicle extending transversely of the longitudinal direction of the vehicle. In the present case the length of the transverse member is not adjustable, and the transverse member has along its length totally 16 pins 6 projecting transversely of the longitudinal direction of the transverse member and constituting coupling elements. Eight pins are connected to the flange 3 and the other eight pins are connected to the flange 4. They are positioned in pairs arranged on a common pin axis S. Each pin is symmetrically shaped with regard to its axis and comprises a head 7 which is enlarged in relation to the diameter a of the pin to diameter A. The head is formed with a conical centering surface 8 tapering in the direction of the connection of the pin with the transverse member.

A retainer carrier 9 is shown above the transverse member 2. As shown in FIG. 2, the retainer carrier is also constituted by a downwardly open channel-shaped bar having substantially the same wall thickness as the transverse member. The two vertical flanges of the channel bar are shown at 10 and 11, while the horizontal connection web is shown as 12. In order to prevent a direct contact of the retainer carrier 9 against the transverse member there are provided spacer elements 13, which are riveted to the retainer carrier and position the carrier a distance b above the transverse member. The retainer carrier is provided with retainers for the loads to be carried by the roof load carrier, for example ski clamps 14. It is also possible to use other types of retainers, for example surf-board retainers, pipe-bar-retainers and so on. The retainers are fixedly or releasably connected with the retainer carrier.

In the vertical flanges 10 and 11 of the retainer carrier there are provided coupling openings 15 as coupling elements, which are complementary with the coupling elements 6 shaped as pins. Each coupling opening comprises a slot 16 extending in the longitudinal direction of the retainer carrier and opening at its one end into an entrance opening 17 or the insertion for the respective pin therein. Each entrance opening constitutes an open connection between the slot and the free edge of the flanges 10 and 11 of the channel bar and is at one side provided with an inclined surface 18.

As appears from FIG. 2, the coupling openings 15 are positioned so that the pins 6 are tightly received in the slot 16 when the retainer carrier is positioned on the transverse member and so that the retainer carrier after having been positioned on the transverse member can be displaced in its longitudinal direction so that the pins will be positioned in the back or closed end of the slot 16. Thus, in the embodiment shown the retainer carrier 9 is displaced to the left after the retainer carrier has been positioned on the transverse member 2 and the pins 6 have been inserted into the slots 16 through the entrance openings 17. The insertion of the pins into the hook-shaped coupling openings 15 provides for a coupling between the retainer carrier 9 and the transverse member 2 which allows only one degree of freedom for opening the coupling as will be further discussed in the following. In other respects the two members are in all additional directions fixed in relation to each other.

FIG. 2 shows the connection of the retainer carrier with the transverse member. The pins 6 project to such an extent with their head 7 that the vertical flanges 10 and 11 of the retainer carrier 9 will be positioned inside the heads 7. The conical inclined surfaces 8 facilitate the positioning of the retainer carrier on the pins 6. The pins 6 and the spacer elements 13 also provide a lateral fixing of the retainer carrier to the transverse member.

The transverse member is at each free end provided with a retainer clamp 19, which provides the connection between the transverse member 2 and the rain gutter of the vehicle. The clamp comprises a lower, free end 20 by means of which the clamp engages the rain gutter and supports the transverse member. A clamping member 21 is displacably connected therewith and engages the under-surface of the rain gutter to clamp the rain gutter between itself and the end 20 of the retainer clamp in the mounted position of the roof load carrier. There is provided an adjustment bolt 22 for adjusting the clamping member. On each clamp 19 there is also provided a snap spring 23 for a locking lever 24. The locking lever is pivotably connected to the transverse member on a horizontal pivot axis which is parallel with the axes V of the pins 6 so that will pivot from an open position to the closed position shown in the drawing. The locking lever has the form of an elongated cover and covers the clamp 19, the adjustment bolt 22, a main portion of the end 20 of the retainer clamp and the clamping member 21 in its closed position. The locking lever supports a lock 25 by means of which it can be fixed to the retainer clamp 19. The snap spring 23 engages an opening (not shown) and provides for a pre-locking. As appears from FIG. 1, the pivot axis V is positioned at the point of connection between the transverse member 2 and the retainer clamp 19. The locking lever is shaped as a two-arm lever, whereby one arm H constitutes the handle and the other arm h constitutes a locking ridge 26 for locking the retainer carrier 9 to the transverse member 2. The two arms form an angle α of about 115° with each other. The locking ridge 26 is formed with the lever arm h so that in the locking position (as shown in FIG. 11) the same is anchored on the transverse member substantially without any clearance between locking ridge 26 and the end of the retainer carrier to thereby prevent the retainer carrier from moving to the right. In the present case this means that the axes of the pins 6 and the longitudinal axes of slots 16 of coupling openings 15 shown in FIG. 1 intesect each other.

In order to release the retainer carrier, the locking lever 24 is pivoted upwards in the direction of the arrow P, whereupon the locking ridge 26 is pivoted away from the adjacent end of the retainer carrier and a substantially straight side 27, having a distance from the axis V constituting only a fraction of the length of the lever arm h, is positioned opposite the end of the retainer carrier to provide the retainer carrier 9 with the necessary free space for a displacement to the right and for lifting and releasing the same from the connection with the pins 6.

The invention is not restricted to the embodiments shown in the drawing. Thus, it is possible to use the invention also for load carriers which are not used on the roof of a vehicle, but for other purposes.

I claim:

1. A car roof carrier comprising at least one elongated support member, attaching means on the ends of said support member adapted to removably attach said support member at its ends to the car roof so that said support member extends across the roof, at least one elongated retainer carrier having a substantially open-sided channel shaped cross-section formed by a web portion and depending legs therefrom adapted to be removably positioned coextensively over said support member so that said legs extend over at least part of said support member, at least one coupling pin projecting from support member transversely with respect to the longitudinal direction thereof, at least one bayonet slot in a leg of said retainer carrier positioned to engage with said pin having an entrance slot extending from the free edge of said leg to a retaining slot extending substantially parallel to the longitudinal direction of said retainer carrier so that said carrier is attachable to said support member by first moving said carrier with respect to said support member to slide said entrance slot over said pin and then moving said carrier toward one end of said support member into the retaining position where said entrance slot is displaced with respect to said pin to prevent withdrawal of said pin through said slot, and releasable locking means operably mounted on the other end of said support member to engage said carrier in the retaining position to prevent movement thereof toward said other end and to release said carrier to allow movement thereof toward said other end for removing said carrier from said support member.

2. A carrier as claimed in claim 1, wherein said retainer carrier is a U-shaped channel bar covering said support member so that said support member is disposed between the legs of the channel bar.

3. A carrier as claimed in claim 2, wherein said support member comprises a downwardly upon U-shaped channel bar.

4. A carrier as claimed in claim 3, wherein a plurality of said pin members are fixedly connected to the legs of the U-shaped channel bar of said support member and a plurality of said bayonet slots are provided cooperatively engageable with said pins.

5. A carrier as claimed in claim 1, wherein said locking means comprises at least one locking lever pivotably connected to said support member, adjacent an end of said retainer carrier and a locking ridge on said locking lever cooperatively engaging said end of said retainer carrier in its closed position to prevent removal of said retainer carrier.

6. A carrier as claimed in claim 5, wherein said locking lever comprises a two-arm lever having one handle arm remote from said retainer carrier and the other arm adjacent the end of said retainer carrier and having said locking ridge on the end thereof.

7. A carrier as claimed in claim 6, wherein said locking lever is pivotally journalled on said support member on a pivot axis which is transverse to the longitudinal direction of said support member.

8. A carrier as claimed in claim 7, wherein said locking lever is positioned near an end portion of said support member and displaces said locking ridge in the direction of the retainer carrier when moved into the locking position.

9. A carrier as claimed in claim 8 wherein said two arms extend at an angle with respect to each other substantially from said pivot axis, said other arm extending in the locking position substantially coextensively with the longitudinal direction of said support member, and said handle arm extending downwardly therefrom.

* * * * *